Figure 1:
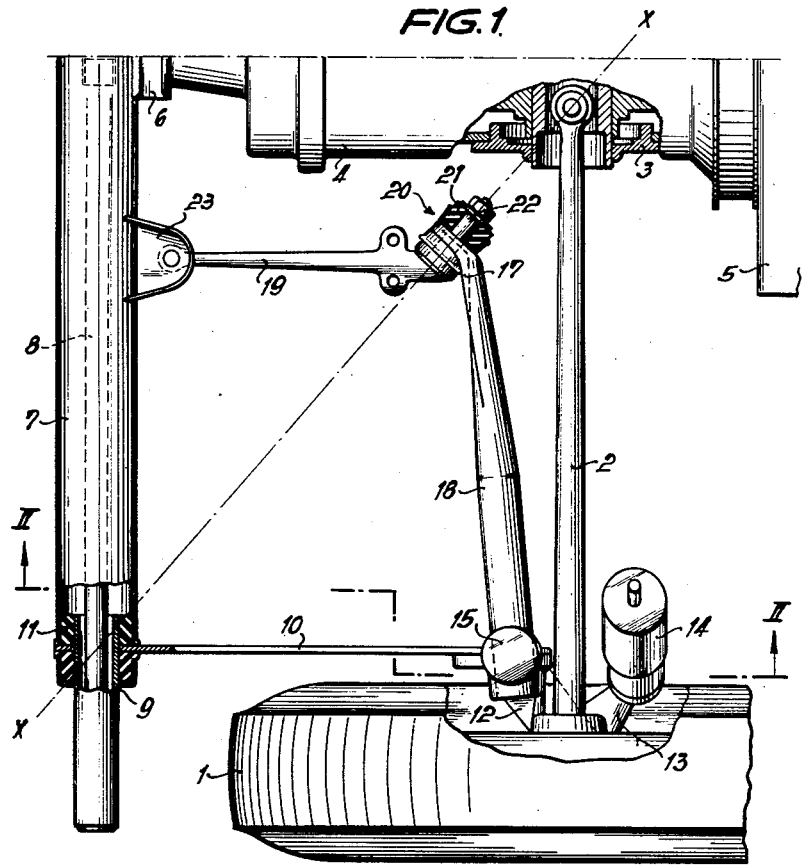

Aug. 30, 1960 W. EYB 2,950,774
INDIVIDUAL WHEEL SUSPENSION FOR DRIVEN HALF-AXLES
Filed May 28, 1958

INVENTOR
WOLFGANG EYB
BY Dicke and Craig
ATTORNEYS

United States Patent Office 2,950,774
Patented Aug. 30, 1960

2,950,774

INDIVIDUAL WHEEL SUSPENSION FOR DRIVEN HALF-AXLES

Wolfgang Eyb, Leonberg, Wurttemberg, Germany, assignor to Firma Dr. Ing. h.c.F. Porsche K.G., Stuttgart, Zuffenhausen, Germany Filed May 28, 1958, Ser. No. 738,337

Claims priority, application Germany June 19, 1957

14 Claims. (Cl. 180—73)

The present invention relates to an individual wheel suspension of driven wheels mounted on swinging half-axles of motor vehicles which are spring-supported over swinging strut members by means of a torsion rod spring disposed outside of the theoretical swinging axis and the drive of which takes place from a drive unit which includes the internal combustion engine, the change-speed transmission and the axle gear.

In the known prior art constructions of this type, the swinging strut members formed by spring leaves turned on edge, i.e., lying in a substantially vertical plane, are able to absorb the brake and accelerating moments, however, the lateral forces occurring, for example, during traversal of curves are transmitted by the tubular axle members to the combined axle and transmission housing. Since the housing in this prior art construction is already very highly loaded from the driving or input thereof, the forces coming from or originating with the wheels can be absorbed therein only by a correspondingly excessive dimension or relatively expensive reinforcement of such a construction. Furthermore, the bearings of the entire drive unit are extraordinarily loaded by the support of the axle.

It is already known with a rear engine vehicle in which the driving engine is disposed at the rear end of the vehicle, to guide the driven wheels by triangularly-shaped guide members which simultaneously carry the spring and damping members. These guide members relieve the transmission housing, however, they are constructed very sturdily and encumber the entire space between the axle drive shaft and the front side of the transmission housing so that only a coil or helical spring may be provided if the useful space which is available is not to be further reduced or limited thereby.

According to the present invention, these disadvantages of the prior art are avoided in that, for purposes of supporting each half-axle, a wheel guide member made of several parts is provided of which one part is pivotally connected to another part thereof at a point along the axis about which the wheels swing. By the employ of such an arrangement, it is possible to obtain a spatially favorable accommodation of the wheel guiding members with the simultaneous use of torsion rod springs for purposes of spring-supporting the wheels so that the space available above the spring and guide members of the axle may be utilized to the fullest extent. The wheel guide member in accordance with the present invention is composed preferably of a two-partite angular support or strut member, the individual parts of which are pivotally connected in the apex of the angle by a rubber joint which is carried or supported by a strut member forming a part of the support member and secured to the frame.

The best utilization of the space takes place if the angular guide or support member subtends an obtuse angle and is so constructed that it extends within close region of the axle shaft or of the transmission housing.

The free end of the strut member is secured at the tubular support member for the torsion rod spring and is connected within the region of the rubber joint by means of a bracket with the vehicle body or chassis. A particularly advantageous reinforcement of the wheel guiding members is obtained by the use of such a construction. The pivotally supported arm of the angular support member is formed by a tubular member rigidly connected with the rear wheel housing, the end of which adjacent the rubber bearing is deformed to be flat and is clamped thereat between rubber segments. The wheel guiding members possess thereby with a relatively low weight a high resistance moment and may be easily manufactured.

If the wheel suspension includes an additional or auxiliary spring and a shock absorber, then a further constructional simplification may be obtained in that the rear wheel housing which contains the movable arm of the angular strut member carries the shock absorber and simultaneously therewith forms the abutment for the additional spring.

Accordingly, it is an object of the present invention to provide an individual wheel suspension, especially for driven wheels of a rear engine vehicle, in which the wheel suspension enables an optimum utilization of the available space.

A further object of the present invention resides in the provision of a wheel suspension for independently suspended driven wheels of a vehicle in which all the forces may be readily absorbed without overloading the housing of the axle gear and/or the housing of the change-speed transmission and internal combustion engine.

Still another object of the present invention is to provide an independent wheel suspension for driven wheels in which the wheel guide members may be readily manufactured and assembled notwithstanding the relatively great sturdiness exhibited thereby.

A further object of the present invention is to provide an independent wheel suspension for driven wheels which enables the use of a torsion rod spring.

Still another object of the present invention resides in the provision of an independent wheel suspension for driven wheels of a rear engine vehicle which offers a relatively high resistance yet is of relatively light weight and does not require an excessively large amount of the relatively small space available in such vehicles.

Figure 2:
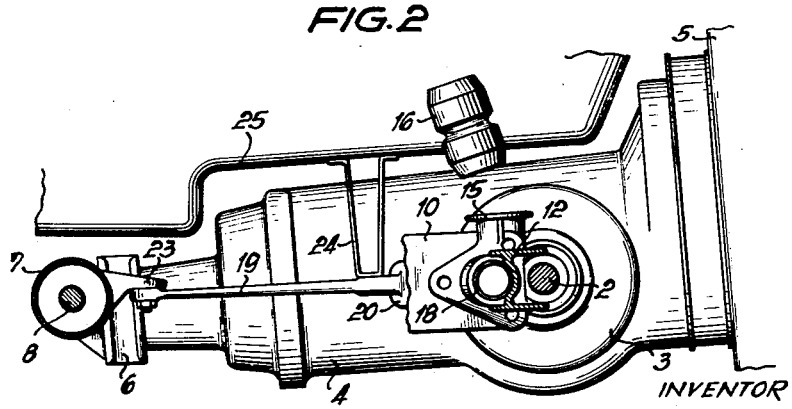

These and other objects, features and advantages of the present invention will become more obvious from the following description when taken in connection with the accompanying drawing which shows, for purposes of illustration only, one embodiment in accordance with the present invention, and wherein:

Figure 1 is a partial plan view of an independent wheel suspension in accordance with the present invention of one side of the vehicle, the other side thereof being of mirror image-like construction, and certain parts thereof being shown in cross section for purposes of better understanding, and Figure 2 is a cross-sectional view taken along line II—II of Figure 1.

Referring now to the drawing, wherein like reference numerals are used throughout the various views to designate like parts, reference numeral 1 designates the wheel of a motor vehicle which is driven by an axle shaft 2. The swinging half axle structures described hereinafter are the structures which include several parts for supporting the vehicle wheels in their swinging movement and the axle shaft 2 is only one part of this overall half axle structure, which shaft, in the present instance, serves primarily to transmit torque from a driving unit to a wheel and the present invention serves to reduce the forces acting transversely or laterally of the vehicle along the axle shaft 2 on the driving unit. The axle shaft 2 is pivotally supported in the differential gear housing 3 which may be of any suitable construction. The differential gear 3 together with the change-speed transmission 4 and the internal combustion engine 5 forms a driving unit which is supported on a tubular cross bearer member 7 by the interposition of resilient rubber bearings 6.

A torsion rod spring 8 is accommodated within the cross bearer member 7 which spring 8 is connected by means of a sleeve 9 with a swinging strut member 10. The strut member 10 is a generally flat member extending on edge longitudinally of the vehicle from the cross member 7 toward axle shaft 2 and being generally in a vertical plane parallel to the longitudinal center line of the vehicle. The strut member will transmit stresses in this vertical plane from the wheel to the torsion rod spring means 8, but offers little resistance to forces from the wheel acting laterally of the vehicle. The swinging strut member 10 is clamped at the frame side thereof between rubber rings 11 and is flangedly connected to the rear wheel housing 12 which receives the axle shaft 2. The rear wheel housing 12 carries the shock absorber 14 over a support or bracket 13 and is provided with an abutment 15 for engaging an additional rubber spring 16. A wheel guiding member constituted by an angular strut member 17 is arranged within the region of the axle shaft 2 and of the cross bearer member 7. The angular strut member 17 which subtends an obtuse angle is formed by a movable arm 18 connected with the rear wheel housing 12 and by a strut member 19 connected to the frame 7. The arm 18 and the strut member 19 are pivotally connected with each other by a rubber joint generally designated by reference numeral 20 which extends with the axis thereof in the swinging axis x—x of the wheel 1. The torsion rod 8, the parts 18 and 19 of the wheel guiding member and the strut member 10 are generally coplanar with the axle shaft 2, the plane being generally horizontal, and the swinging axis x—x seen in Figure 1 passes through the members 10 and 18 at the ends thereof remote from the wheel housing. These latter ends are pivotally supported at relatively fixed points which define the swinging axis x—x which is angularly disposed or extends obliquely with respect to the torsion bar 8 as well as to the direction of the strut member 10. The rubber joint 20 consists of rubber rings 21 and of a pin member 22 which forms a part of the strut member 19. The arm 18 formed of tubular material, the end of which facing the rubber bearing 20 is deformed or flattened and is clamped thereat between the rubber rings 21, is thereby pivotally connected with the strut member 19. The free end of the strut member 19 is secured at the cross bearer member 7 by means of a support or holder member 23. The strut member 19 is connected within the region of the rubber joint 20 by means of bracket 24 (Figure 2) with the floor 25 of the vehicle body.

*Operation*

The operation of the wheel suspension in accordance with the present invention is as follows:

During spring movement of the wheel 1, the torsion rod 8 is forcibly rotated or twisted by means of the swinging strut member 10 which has no flexibility or yieldingness in the direction of rotation thereof. Simultaneously therewith, the axle shaft 2 is displaced or swung about the point of pivotal connection thereof in the differential gear housing 3 and the arm 18 is displaced or swung about the pin member 22 within the swinging axis x—x in the direction of the spring movement of the wheel 1. The swinging strut member 10 has to absorb, in addition to the torque of the return effect of the spring 8, a part of the driving and braking moments whereas the remainder of these torques and especially the lateral forces resulting from the traversal of or driving through curves are absorbed by the angular strut member 17.

The present invention is not limited to the particular embodiment illustrated herein. For example, instead of the tubularly formed angular strut member, other bearer members of different cross section having a corresponding effect may be used. Furthermore, the rubber joint may be interchanged with another rotatable connection, for example, a purely slidable bearing with synthetic bearing bushings requiring no service. Thus, it is quite obvious that the present invention is susceptible of many changes and modifications within the spirit and scope of the present invention, and I, therefore, intend to cover all such changes and modifications as are encompassed by the appended claims.

I claim:

1. An individual wheel suspension for the driven wheels of a motor vehicle supported on swingable half axle structures comprising a relatively stationary vehicle part, torsion rod spring means disposed with its torsional axis angularly disposed with respect to the swinging axis of the respective wheel, a swinging strut member interconnecting said torsion rod and said wheel to torsionally actuate the rod in response to vertical movement of the wheel, drive means including an axle shaft for driving said wheel, and wheel guiding means formed of two parts for swingably supporting said wheel from said relatively stationary vehicle part including pivotal connecting means between said two wheel-guiding parts at a location coinciding with the swinging axis of said wheel for pivotally connecting one of said two parts with the other part thereof, means for connecting said one part to said stationary vehicle part, and means for connecting said other part to said wheel, said other part being offset at one side of said axle shaft and extending in a direction generally parallel to said axle shaft whereby said wheel guiding means resist forces from said wheel acting transversely of the vehicle to reduce the stresses on said drive means.

2. An individual wheel suspension according to claim 1 wherein said wheel guiding means includes an angular support member composed of said two parts, said pivotal connecting means including rubber-joint connecting means for pivotally connecting said two parts essentially at the apex of the angle formed thereby, said rubber-joint means being carried by the part of the support member connected to said relatively stationary part.

3. An individual wheel suspension according to claim 1 wherein said wheel guiding means includes an angular support member comprising said two parts subtending an obtuse angle and so constructed as to extend within the region of the corresponding half axle.

4. An individual wheel suspension according to claim 3 wherein said one of said parts of said angular support member is a strut member, said stationary vehicle part further comprising a tubular member accommodating therein said torsion rod spring means, said strut member being secured to said tubular member, the connecting means for securing said one part of the angular support to a stationary vehicle part including bracket means for rigidly connecting said strut member with the floor of the vehicle.

5. An individual wheel suspension according to claim 1 further comprising a wheel housing for said wheel, one of said two parts being rigidly connected with said wheel housing and being flattened at the end thereof opposite the connection with said wheel housing, said pivotal connecting means including rubber-joint means including two rubber segments for pivotally connecting said one part at the flattened end thereof with the other part.

6. An individual wheel suspension according to claim 5 further comprising additional spring means and shock absorber means, and means supporting said shock absorber means on said wheel housing and forming an abutment for said additional spring means.

7. An individual wheel suspension for the driven wheels of a motor vehicle supported on swingable half axle structures comprising a relatively stationary vehicle part, torsion rod spring means disposed with its torsional axis angularly disposed with respect to swinging axis of the respective wheel, a swinging strut member interconnecting said rod and said wheel to torsionally actuate the rod in response to vertical movement of the wheel, drive means for driving said wheel including an internal combustion engine, a change-speed transmission and an axle gear forming a driving unit, an axle shaft extending from said driving unit to the wheel for driving the latter and wheel guiding means formed of two parts for swingably supporting said wheel from said relatively stationary vehicle part including pivotal connecting means between said two wheel-guiding parts at a location coinciding with the swinging axis of said wheel for pivotally connecting one of said parts with the other part thereof, means for connecting said one part to said stationary vehicle part, and means for connecting said other part to said wheel, said other part extending in a direction generally parallel to the direction of said axle shaft whereby said wheel guiding means resist forces from said wheel acting laterally of the vehicle to reduce the stresses on said driving unit.

8. An individual wheel suspension according to claim 7 wherein said wheel guiding means forms an angular support member, said pivotal connecting means including rubber-joint means pivotally connecting said two parts within the center of the angle defined by the support member, said rubber-joint means being supported by the one part of the support member secured to said relatively stationary part.

9. An individual wheel suspension according to claim 8 wherein said angular support member extends within the region of said driving unit.

10. An individual wheel suspension for the driven wheels of a motor vehicle supported on swingable half axle structures comprising a relatively stationary vehicle part, torsion rod spring means disposed with its torsional axis angularly disposed with respect to swinging axis of the respective wheel, a swinging strut member interconnecting said rod and said wheel to torsionally actuate the rod in response to vertical movement of the wheel, drive means for driving said wheel including an internal combustion engine, a change-speed transmission and an axle gear forming a driving unit, an axle shaft connecting said driving unit with the respective wheel for driving the latter, and wheel guiding means formed of a two-partite angular strut member subtending a relatively large angle for swingably supporting said wheel from said relatively stationary part including pivotal connecting means between the two parts of said angular strut member disposed at a location coinciding with the swinging axis of said wheel for pivotally connecting one of said strut member parts with the other part thereof, means for connecting said one part to said stationary vehicle part, and means for connecting said other part to said wheel, said other part extending in a direction generally parallel to the direction of said axle shaft whereby said wheel guiding means resist forces from said wheel acting laterally of the vehicle to reduce the stresses on said driving unit.

11. An individual wheel suspension according to claim 10 wherein said spring means includes a tubular member surrounding the rod, one end of said one of said strut member parts being secured to said tubular member, the connecting means for securing said one part to a stationary vehicle part including bracket means for securing said one part at the other end thereof with respect to said relatively stationary vehicle part.

12. An individual wheel suspension according to claim 11 where the other strut member part is formed by a tubular member, further comprising a wheel housing for said wheel rigidly connected with said other part, and the portion of said other part adjacent said pivotal connecting means being flattened and clamped between rubber segments forming part of said pivotal connecting means.

13. An individual wheel suspension according to claim 1, wherein said swinging strut member is a relatively flat member extending on edge in the longitudinal direction of the vehicle and in a generally vertical plane, said flat strut member having one end connected to said torsion rod spring means and the other end connected to the wheel.

14. An individual wheel suspension for the driven wheels of a motor vehicle supported on swingable half axle structures comprising drive means for driving said wheels and further comprising for each wheel an axle shaft extending laterally of the vehicle from the drive means to the respective wheel, a torsion rod extending laterally of the vehicle and having a relatively fixed end and a deflectable end, a swinging strut member secured at one end to said deflectable end and extending therefrom in longitudinal direction of the vehicle toward the axle shaft of the vehicle, said swinging strut member having the other end connected to the wheel, a relatively stationary part between said drive means and the wheel, a wheel guiding strut extending generally parallel to said axle shaft and having one end pivotally connected to said relatively stationary vehicle part and the other end connected to said wheel, the pivotally connected end of said strut and an end point of said swinging strut member adjacent the torsion rod's deflectable end defining a swinging axis for said wheel, said axis extending obliquely relative to both the axis of said torsion rod and the longitudinal direction of the vehicle, said axle shaft being connected by a universal joint to said drive means at a further point along said axis said wheel guiding strut being so constructed and arranged as to reduce the stresses on said drive means resulting from forces on said wheels acting transversely of the vehicle.

References Cited in the file of this patent

UNITED STATES PATENTS

| | | |
|---|---|---|
| 2,226,047 | Borgward | Dec. 24, 1940 |
| 2,286,609 | Ledwinka | June 16, 1942 |
| 2,815,084 | Fortgang | Dec. 3, 1957 |
| 2,841,230 | Neuschaefer et al. | July 1, 1958 |
| 2,843,214 | Muller | July 15, 1958 |
| 2,856,201 | Muller et al. | Oct. 14, 1958 |